(No Model.)

J. M. FRYSINGER.
BAGGAGE TRUCK.

No. 526,698.                    Patented Oct. 2, 1894.

Witnesses
G. T. Myers
J. M. Witherow

Inventor
J. M. Frysinger
By Joseph L. Atkins
Attorney

UNITED STATES PATENT OFFICE.

JAMES M. FRYSINGER, OF OHIO CITY, OHIO.

BAGGAGE-TRUCK.

SPECIFICATION forming part of Letters Patent No. 526,698, dated October 2, 1894.

Application filed December 19, 1893. Serial No. 494,053. (No model.)

*To all whom it may concern:*

Be it known that I, JAMES M. FRYSINGER, of Ohio City, county of Van Wert, State of Ohio, have invented certain new and useful Improvements in Baggage-Trucks, of which the following is a specification, reference being had to the accompanying drawings.

The object of my invention is to produce an improved device for loading and unloading baggage. It is designed for use in railway stations.

Figure 1:
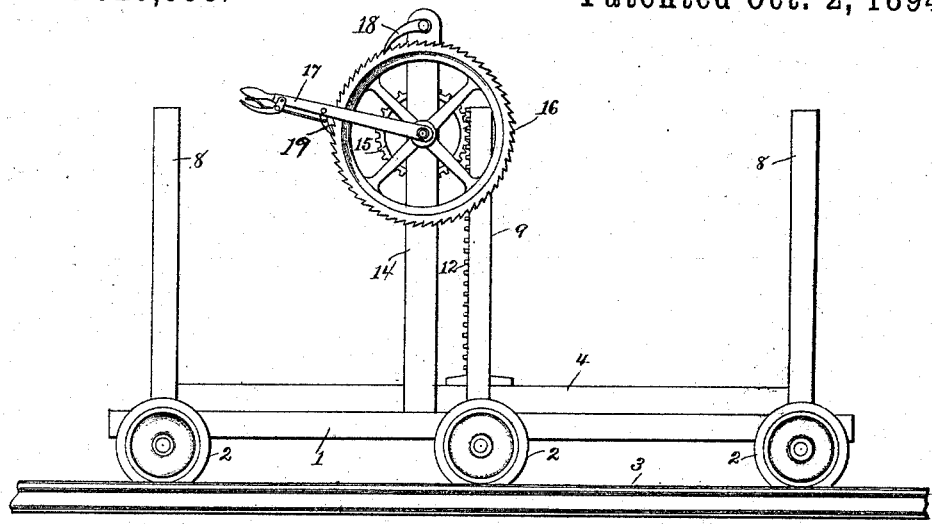
Figure 2:
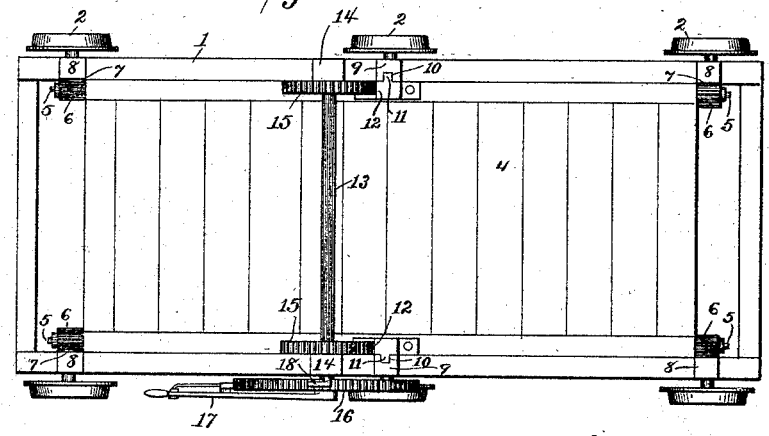
Figure 3:
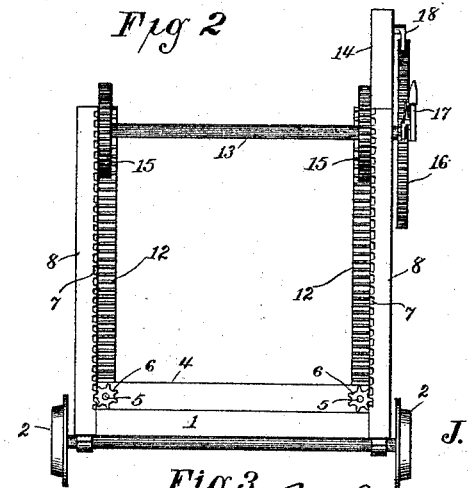

In the accompanying drawings: Figure 1 is a side elevation of my truck. Fig. 2 is a top plan view thereof. Fig. 3 is an end elevation.

Referring to the figures on the drawings: 1 indicates a truck frame carried upon wheels 2, which move on tracks 3.

4 indicates a movable platform which carries at its four corners, as upon studs 5, pinions 6. These pinions mesh, respectively, with a rack 7 carried on each of the four corner posts 8.

9 indicates each of the central posts projecting upwardly from the truck, and having a groove 10 in which a rib 11, of a rack 12, secured to the movable platform, works.

By the mechanism described the movable platform is caused to move squarely and smoothly up and down between the posts which guide it. For elevating the platform, I prefer to employ a shaft 13 carried in upright bearings 14 that are mounted on the truck. To the shaft are secured gears 15 that mesh with the racks 12 and which by the rotation of the shaft impart vertical movement to the racks and movable platform, to which they are secured.

For imparting motion to the shaft I prefer to employ a ratchet wheel 16 secured to the shaft 10 and a lever 17 also pivoted thereto, and carrying a pawl 19 in proximity to the teeth of the ratchet wheel. By the movement of the lever, the wheel may be caused to rotate a required distance. The wheel is held in position by a pawl 18 pivoted to the upper end of the upright 14 adjacent to the ratchet wheel, and engaging, by gravity, with the teeth of the ratchet wheel.

What I claim is—

1. The combination with a truck provided with racks at its corners, and central posts provided with grooves, of a movable platform provided with pinions and guide ribs engaging the racks and grooves of the truck, and means for raising and lowering the platform, substantially as specified.

2. The combination with a truck provided with racks, pinions, and guide grooves, of a movable platform provided with pinions, and racks provided with guide ribs, said pinions, racks and ribs engaging the racks, pinions and grooves of the truck, and a lever adapted to actuate the pinions carried upon the truck to raise the platform, substantially as specified.

3. The combination with a truck provided with corner posts and racks, central posts provided with grooves, and upright bearings, a shaft thereon provided with pinions and a ratchet wheel, a ratchet lever loosely mounted upon the shaft adapted to actuate the ratchet wheel and pinions, and a dog or pawl engaging the ratchet wheel, of a movable platform provided with pinions at its corners, and racks provided with guide ribs, said pinions, racks and ribs engaging, respectively, the racks, pinions and grooves of the truck, substantially as specified.

In testimony of all which I have hereunto subscribed my name.

JAMES M. FRYSINGER.

Witnesses:
W. D. MARSH,
JOHN H. BLOYD.